Sept. 13, 1932.  A. KINGSBURY  1,876,690
SPHERICAL BEARING
Filed Aug. 9, 1929   5 Sheets-Sheet 3
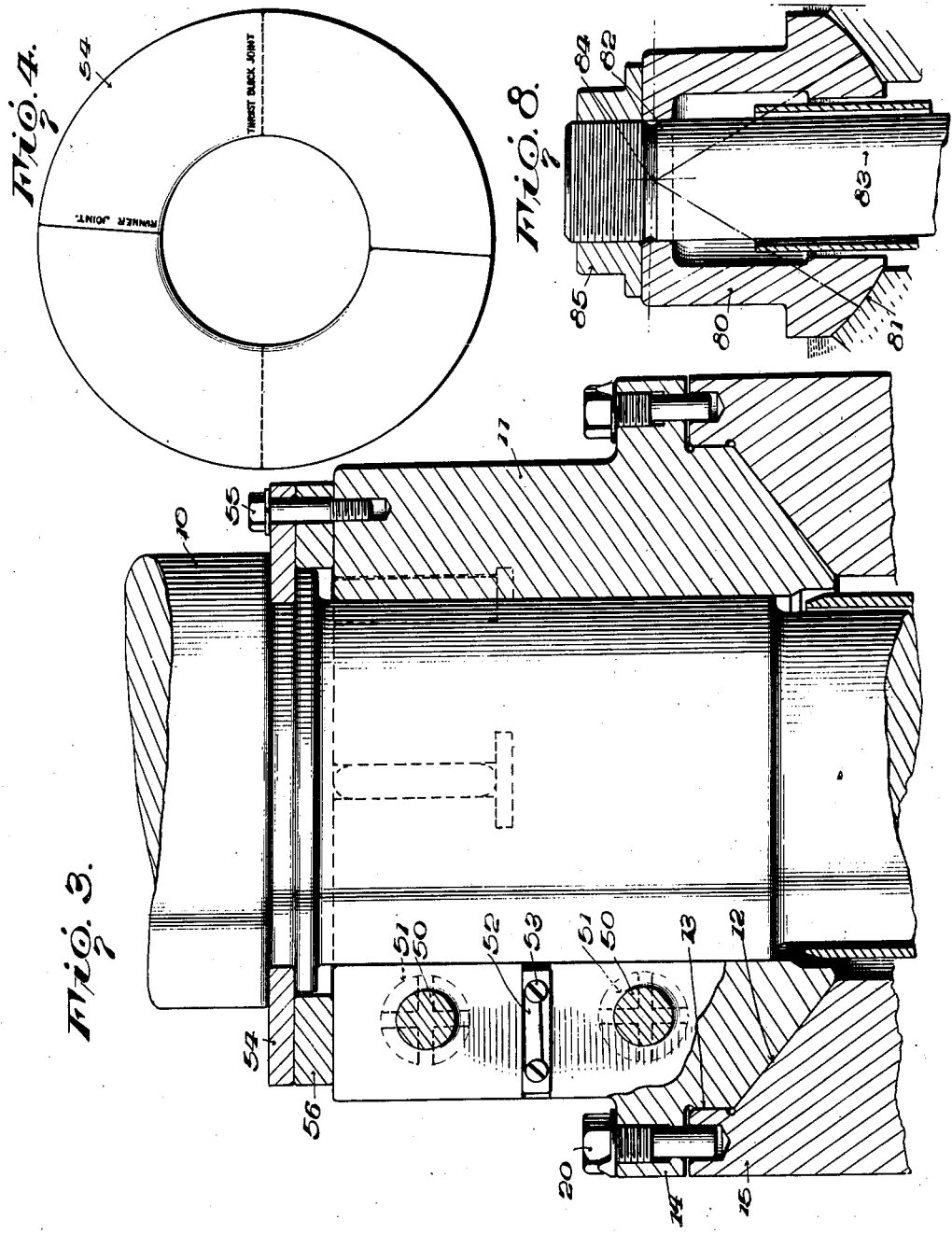
Inventor
Albert Kingsbury
By
Cameron, Kerkam & Sutton
Attorneys.

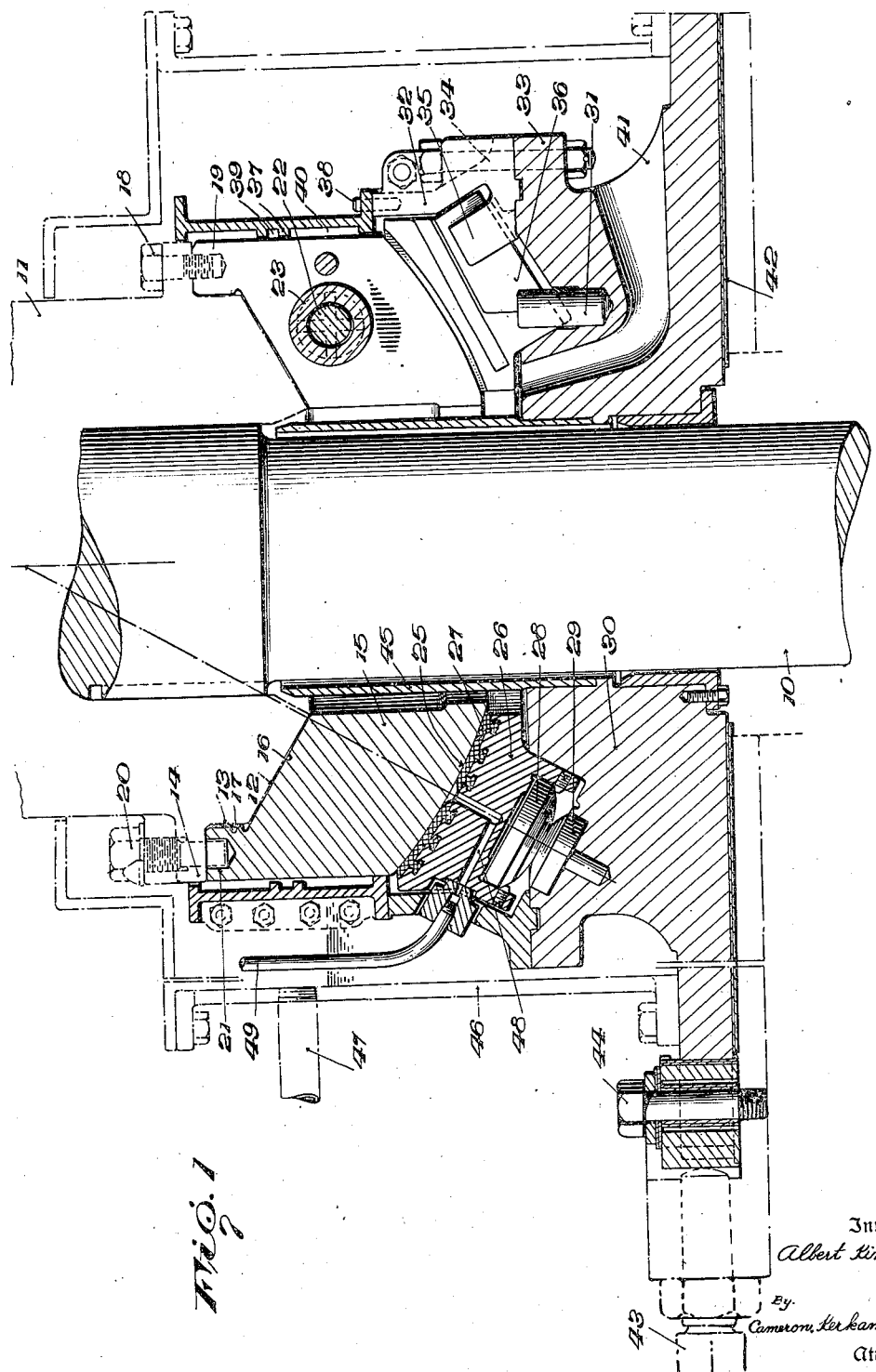

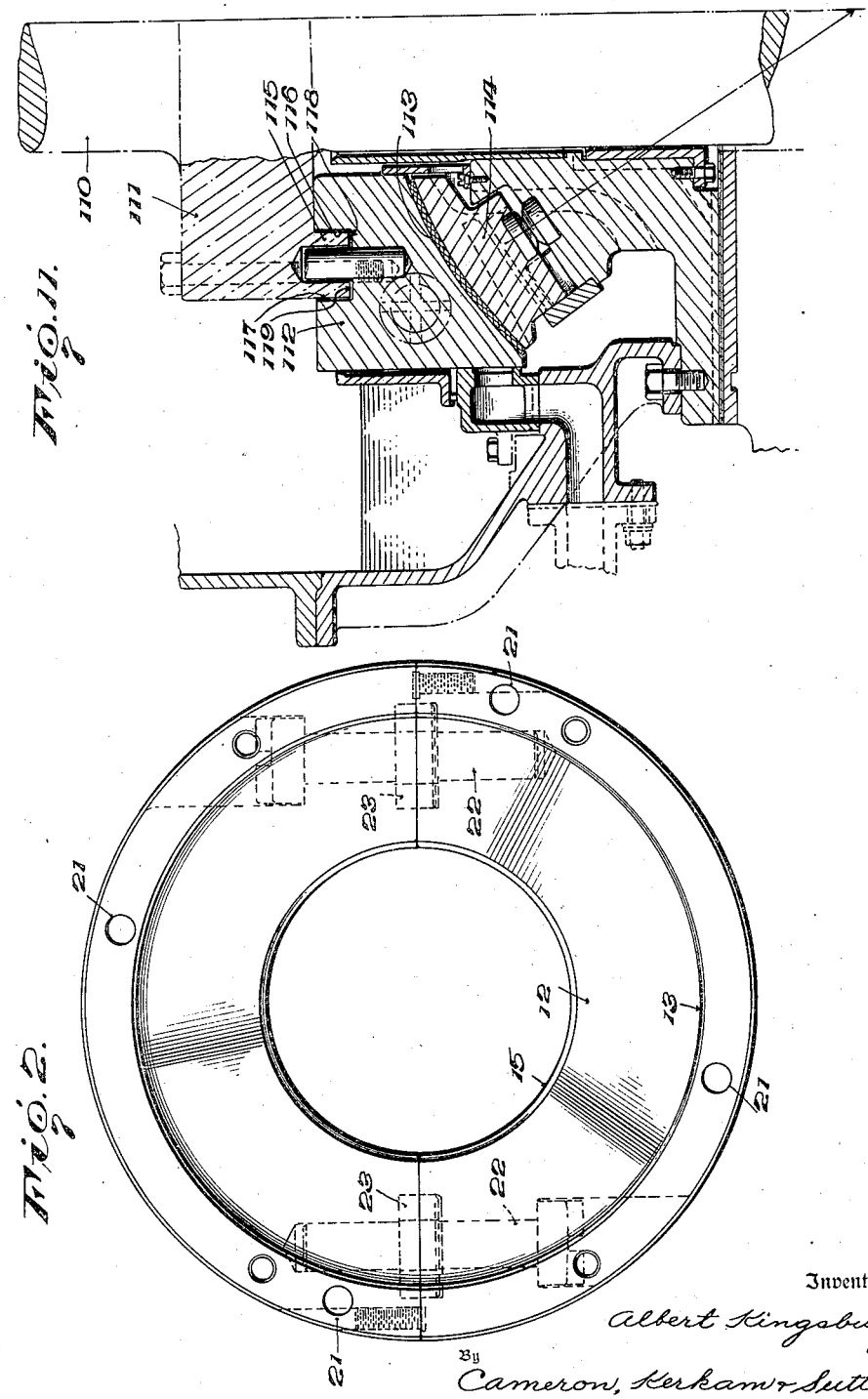

Sept. 13, 1932.  A. KINGSBURY  1,876,690
SPHERICAL BEARING
Filed Aug. 9, 1929  5 Sheets-Sheet 4
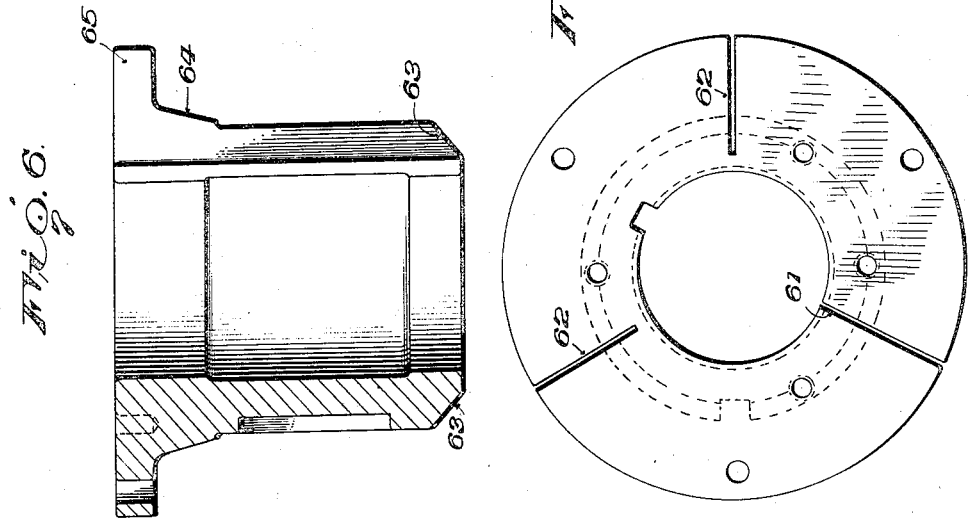
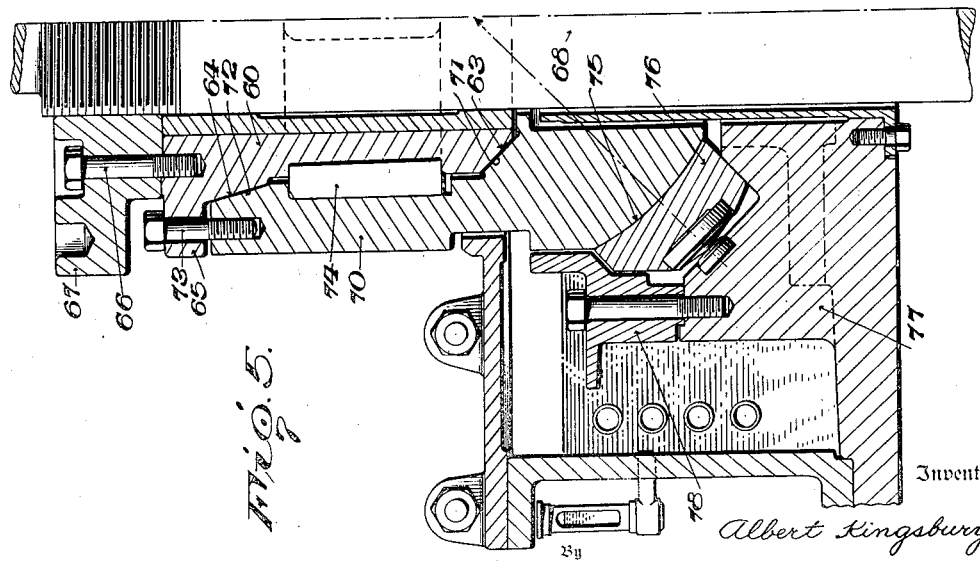
Inventor
Albert Kingsbury
By Cameron, Kerkam & Sutton.
Attorneys Sept. 13, 1932.  A. KINGSBURY  1,876,690
SPHERICAL BEARING
Filed Aug. 9, 1929  5 Sheets-Sheet 5
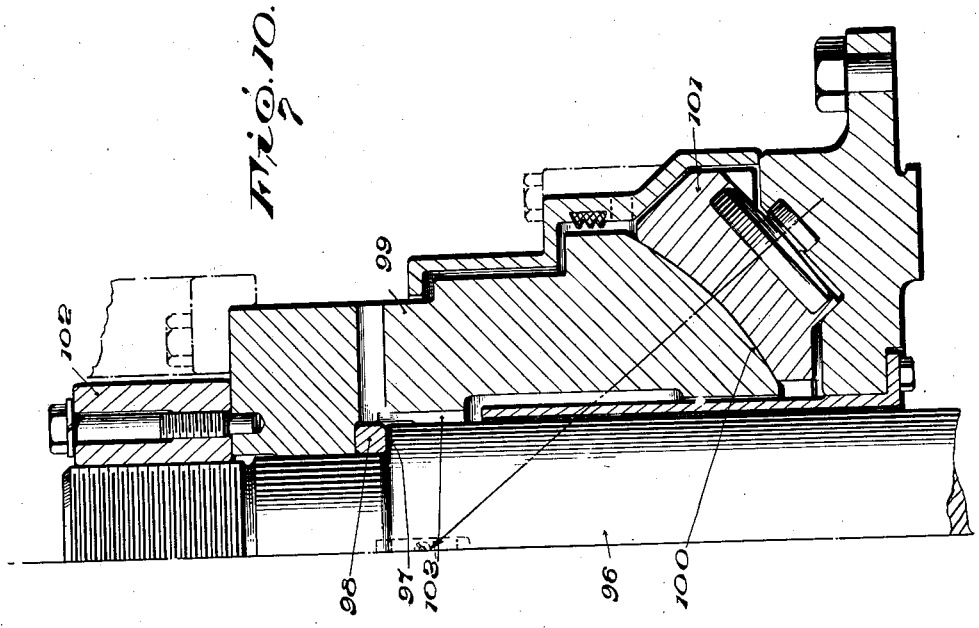
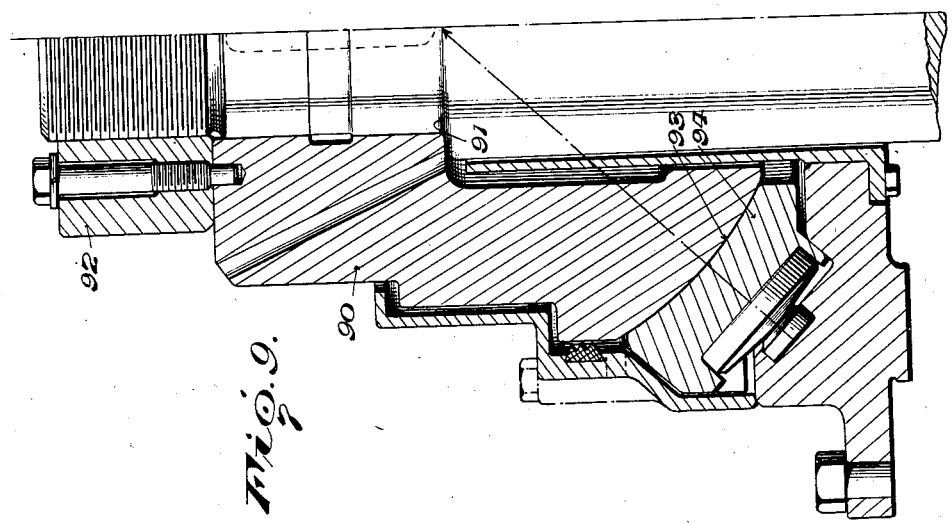
Inventor
Albert Kingsbury
By
Cameron, Kerkam & Sutton.
Attorneys Patented Sept. 13, 1932

1,876,690

UNITED STATES PATENT OFFICE

ALBERT KINGSBURY, OF GREENWICH, CONNECTICUT, ASSIGNOR TO KINGSBURY MACHINE WORKS, INC., OF PHILADELPHIA, PENNSYLVANIA, A CORPORATION OF DELAWARE

SPHERICAL BEARING

Application filed August 9, 1929. Serial No. 384,554.

This invention relates to thrust bearings, and more particularly to thrust bearings of the type employing spherical surfaces of bearing engagement.

In my prior application, Serial No. 226,001, filed October 13, 1927, for bearings, which has matured into Patent No. 1,739,362, granted December 10, 1929, there are pointed out some of the advantages to be obtained from the use in a thrust bearing of spherical surfaces of bearing engagement, this application disclosing a bearing wherein the thrust block is integral with the shaft and the bearing surface of the runner is concave, and also a bearing wherein a rotary thrust element is attached to the shaft and the bearing surface thereof is convex.

The present application, which is a continuation in part of said application Serial No. 266,001, is more particularly concerned with thrust bearings of the character employing a convex bearing surface on the rotary thrust element although, as will appear hereinafter, some of the features of the present invention are also applicable to bearings wherein the bearing surface of the rotary thrust element is concave.

It is an object of this invention to provide thrust bearings of the character employing spherical or conical surfaces of bearing engagement, and which for convenience will hereinafter be referred to generally as spherical bearings—which term is to be expressly understood as including bearing surfaces that are conical as well as bearing surfaces that are spherical—of such construction as to facilitate the use of convex bearing surfaces on the rotary thrust elements.

Another object of this invention is to provide thrust bearings of the type characterized which are so constructed as to facilitate the use of rotary thrust elements which are separate from their shafts, whether they are of one piece or split construction, and also to facilitate the use of split rotary thrust elements.

Another object of this invention is to provide thrust bearings of the type characterized wherein the effect of expansion in the rotary thrust element, arising by reason of the radial component of the thrust load or the rise in temperature due to the heat of friction generated during the normal operation of the bearing, is minimized or eliminated in so far as looseness or detrimental eccentricity of the rotary thrust element is concerned.

Other objects of the present invention relate to the provision of spherical thrust bearings having novel and improved features of construction and operation, as will appear more fully hereinafter.

The invention is capable of receiving a variety of mechanical expressions, some of which are shown on the accompanying drawings, but it is to be expressly understood that the drawings are for purposes of illustration only, and are not intended to constitute a definition of the limits of the invention, reference being had to the appended claims for that purpose.

Referring in detail to the drawings, wherein the same reference characters are employed to designate corresponding parts in the several figures, Fig. 1 is an axial section of a spherical thrust bearing embodying the present invention;

Fig. 2 is a plan of the runner shown in Fig. 1;

Fig. 3 is an enlarged axial section through a thrust block such as may be used in the embodiment of Fig. 1;

Fig. 4 is a diagrammatic view illustrating the staggering of the joints where a split runner and a split thrust block are employed;

Fig. 5 is a half axial section of another embodiment of the present invention;

Fig. 6 is an axial section of the thrust block of Fig. 5;

Fig. 7 is a plan of the thrust block of Fig. 5;

Fig. 8 is an axial diagrammatic section of a spherical thrust bearing for the purpose of illustrating certain features of the present invention;

Fig. 9 is a half axial section of another embodiment of the present invention;

Fig. 10 is a half axial section of yet another embodiment of the present invention; and Fig. 11 is a half axial section of a further embodiment of the present invention.

In the form shown in Figs. 1, 2 and 3, the shaft is designated 10 and carries in any suitable way a rotary thrust element, here shown as composed of a thrust block and a runner separate therefrom and attached thereto. The thrust block 11 may be in one piece with the shaft, although the present invention facilitates the use of a thrust block separate from the shaft, and also desirably split for convenience of assembly therewith, as illustrated in Fig. 3 and explained more in detail hereinafter. The lower or inner face of the thrust block 11 is made conical as shown at 12, and at its outer periphery said conical surface terminates in a turned cylindrical surface 13, and axially above or outside of said turned cylindrical surface 13 there is a radial flange 14.

Mounted on the thrust block 11 and drivingly connected therewith in any suitable way is a runner 15 provided with an upper or outer conical surface 16 which mates with the conical surface 12 of the thrust block 11 and with a turned cylindrical surface 17 which constitutes a close fit with the turned cylindrical surface 13 of the thrust block 11. The close fit between the surfaces 13 and 17 provides for exact preliminary alignment of the parts when the runner is assembled with the thrust block, but during the normal operation of the bearing, owing to the conical surfaces of engagement between the thrust block and the runner, said runner can expand relatively to the thrust block under the increase in temperature arising from the heat of friction generated during the normal operation of the bearing without losing its concentricity with respect to the thrust block, even though the surface 17 expands somewhat away from the surface 13.

In the form shown the runner 15 is drivingly attached to the thrust block 11 by bolts 18 which pass through the flange 14 into the axial flange 19 formed on the runner around the turned surface 17, and the driving relation between the two is also maintained by dowels, in the form of special bolts 20, which also pass through the flange 14 into dowel holes 21 formed in said axial flange 19. The runner 15 is shown as made in halves connected together by bolts 22, shown as placed approximately half-way between the conical surface 16 and the bearing surface to be described, and as the joints between the halves of the runner must be held against relative motion in two directions, circular dowel bushings 23 are preferably employed around the bolts 22. While a single bolt has been shown at each joint of the runner in Fig. 1, two or more bolts may be used at each joint if desired, particularly where the runner is of greater radius than illustrated in Fig. 1.

The lower or inner surface of the runner 15 is provided with a convex spherical bearing surface 25, the radius and center of curvature of said bearing surface being suitably selected and located in accordance with the principles more fully explained in my application Serial No. 226,001, and as explained in said application, the conical surfaces 12 and 16 are preferably made parallel with the mean tangents of said spherical surface 25.

Cooperating with the spherical bearing surface 25 of the runner is a stationary bearing member of any suitable construction, which may be composed of structurally independent shoes, or interconnected shoes, or the stationary bearing member may take the form of a flexible or semiflexible unitary or sectional element. As shown, the stationary bearing member is in the form of a plurality of shoes 26 having concave spherical bearing surfaces 27 which mate with the convex spherical surface 25 of the runner. Said shoes 26 may be mounted in any suitable way, with or without provision for automatic interequalization of the pressure between the several shoes, being shown as provided in their rear faces with spherically faced blocks 28 which engage with the spherical surfaces of blocks 29 carried by a base ring 30 of any suitable type and construction, whereby said shoes are mounted to tilt both radially and circumferentially with respect to the axis of the bearing.

As shown, the shoes 25 are initially positioned by dowel pins 31 carried by the base ring 30, and are retained against displacement by shoe retaining members 32, one for each shoe, secured to a radial flange 33 on the base ring by one or more bolts 34, and having inwardly and upwardly projecting lugs 35 which engage loosely with flat surfaces 36 provided on each shoe. An air-seal ring 37 is shown as mounted on the shoe retaining elements 32, as by dowel pins 38, said air-seal ring being provided with an intermediate groove 39 which is kept full of oil by the viscosity-pump action of the groove 40.

The base ring 30 is shown as provided with suitable passages 41 for the oil circulation, and suitably insulated from the frame or base plate at 42, and also provided with adjusting bolts 43 and retaining bolts 44 for effecting adjustment of the base plate in a plane at right angles to the axis of the shaft, said adjusting bolts being of the general character disclosed in my application Serial No. 226,001, or of any other suitable character. The base ring 30 also carries an inner oil retaining ring 45 and an outer oil retaining ring or housing 46, said retaining rings 45 and 46, together with the base ring 30, providing an oil well in which the bearing surfaces are immersed. Suitable provision for the circulation of the oil is indicated at 47, or if desired the oil well may be provided with a cooling coil as well understood in the art.

As shown, each shoe is also provided with oil passages 48 with which communicates a pipe 49 leading from any suitable source of pressure to the end that oil under pressure may be supplied to the bearing surfaces at starting, as disclosed and claimed in my prior Patent No. 1,117,504 granted November 17, 1914.

It is to be expressly understood however that the details of construction of the stationary bearing member and its support, the base ring and housing, the oil well and the provisions for oil circulation and cooling, and the parts associated therewith, constitute no part of the present invention, and therefore they have been illustrated more or less diagrammatically and only as typical of any suitable means for supporting, lubricating, etc., the bearing members.

While the thrust block 11 may be formed integral with the shaft 10, said thrust block as heretofore pointed out is preferably made in halves as shown in Fig. 3, in which event the joints of the thrust block should be staggered with respect to the joints of the runner as illustrated in Fig. 4. The halves of the thrust block are suitably connected together by bolts 50, which are preferably surrounded by cylindrical dowel bushings 51 as shown. Any suitable number of bolts may be used. Moreover, in order to hold the halves of the block in line axially, cross-keys 52, suitably attached to one of the halves as by-screws 53, are preferably employed at each joint. The use of a split thrust block as shown enables the retention of the thrust block on the shaft by means of a ring key 54, to which the thrust block is suitably attached as by bolts 55, and an adjusting ring 56 may be interposed between the ring key and the thrust block so that the axial adjustment of the bearing can be entirely effected by varying the thickness of said ring 56. This provision for axial adjustment at the thrust block enables the use of a simple form of base ring, and therefore gives a wide range of utility to the bearing.

In operation, the reaction between the thrust surfaces of the runner and shoes is in the direction of the radius of curvature of said surfaces, and hence the runner is pressed toward the shaft. Similarly, the reaction between the runner and thrust block is in the direction of the normals to the conical surfaces of engagement or fit therebetween, and therefore the runner presses the thrust block toward the shaft. The load, therefore, tends to urge the runner and the thrust block toward the shaft, and this will in a measure counteract the tendency of the block and runner to expand away from the shaft owing to the rise in temperature of the parts because of the heat of friction generated during the operation of the bearing. Therefore, as the radial component of the thrust load acts in opposition to the tendency of the runner and thrust block to expand away from the shaft under the action of the heat of friction, a split thrust block can be safely used without danger of looseness and consequent eccentricity of the thrust block. The temperature of the runner, and therefore the extent of expansion thereof, will be somewhat greater than that of the thrust block, but owing to the conical surfaces of engagement between the runner and thrust block, the runner is maintained concentric with the thrust block. Therefore, the advantages of the spherical bearing can be obtained while using convex bearing surfaces on the rotary thrust element, and the additional advantages inherent in the use of a split rotary thrust element can also be secured.

In the embodiment illustrated in Figs. 5, 6 and 7 the rotary thrust element is composed of a thrust block and a separate runner attached thereto. The thrust block 60 is in the form of a sleeve, which is split at 61 and provided with one or more kerfs 62 which render it flexible, so that it can be compressed against the shaft by the radial component of the thrust pressure. At its inner or lower end, the thrust block 60 is provided with a conical surface 63, shown as making an angle of approximately 45° with the axis thereof, and adjacent its outer or upper end said block is provided with a second conical surface 64, shown as making an angle of approximately 30° with the axis. Above or outside of the latter said thrust block is provided with a radial flange 65 by which it may be attached in any suitable way, as by bolts 66, to suitable means as a ring key or a nut 67 carried by the threaded end of the shaft 68.

The runner 70 is provided with conical surfaces 71 and 72 which respectively mate with the conical surfaces 63 and 64 of the thrust block. The runner 70 is suitably attached to the thrust block as by bolts 73 and may also be keyed thereto as illustrated at 74. It is also provided with a convex spherical bearing surface 75 which cooperates with a stationary bearing member of any suitable construction, shown as including tiltably mounted shoes 76, suitably mounted on a base ring 77 and retained thereon by one or more retaining members 78.

Owing to the conical surfaces of engagement, 63 and 71 and 64 and 72, between the runner and the thrust block, the thrust load will cause the upper and lower ends of the thrust block to be pressed inwardly toward the shaft. As the lower or inner end of the thrust block is nearer to the bearing surfaces than the upper or outer end, the surfaces 63 and 71 will be hotter than the surfaces 64 and 72, and therefore the angle of the surfaces 63 and 71 with respect to the axis of the shaft should be larger than the angle of the surfaces 64 and 72, the relation of the angularity of these surfaces being selected with regard to the difference in temperature therebetween. Both pairs of conical surfaces will be retained in contact at all practical temperatures, but even if the relative angularity of the conical surfaces is not exactly right for the respective temperatures to which they are subjected the elasticity of the thrust block will tend to retain the conical surfaces in proper contact and the desired concentricity will be maintained, particularly at the lower or inner conical surfaces 63 and 71.

Since the runner of this embodiment is made in one piece, and can therefore withstand bursting stresses, it can also be used when provided with a concave bearing surface, but in this event the conical surfaces 63 and 71 and 64 and 72 should be carefully designed so that both conical surfaces will be active in compressing the thrust block against the shaft, if eccentricity and the departure of the center of curvature of the bearing surfaces from the axis of the shaft is to be avoided.

In constructions of the type illustrated in Fig. 5, if the conical surface containing the mean normals to the bearing surfaces 75, bisects the conical surfaces 63 and 71, the fit between the conical surfaces 64 and 72 becomes of less importance, and it does not matter if, owing to different rates of expansion, the upper surface 72 lacks a close fit with the conical surface 64. Therefore, less accurate workmanship is required in constructing the parts if the bearing surface 75 is so formed that its mean tangents make such an angle to the axis of the shaft that the normals thereto bisect the engaging surfaces 63 and 71. In such a construction the mean normals to the conical surfaces 63 and 71 would converge in the axis of the shaft at the center of curvature of the spherical surfaces of bearing engagement.

Where the elements of conical fit are relatively long as compared to the mean diameter of the engaging surfaces, as in the embodiment of Fig. 1, for example, there is little chance that the conical surfaces will lose their concentricity, and the desired concentricity will be retained even though the apex of the cone of mean normals to the surfaces of conical fit are above or below the center of curvature of the bearing surfaces. But where the elements of conical fit are relatively short, the center of curvature of the bearing surfaces should nearly, if not exactly, coincide with the apex of the cone of mean normals to the surface of conical fit, unless some additional means, such as a second conical fit as illustrated in Fig. 5, or a close cylindrical fit as to be hereinafter discussed, is employed to preserve the proper axial alignment of said apex and said center of curvature. The second conical fit provided by the surfaces 64 and 72 in the embodiment of Fig. 5 permits the mean tangents to the bearing surfaces to be disposed at approximately an angle of 45° to the axis of the shaft, and the conical surfaces 63 and 71 to have a corresponding angularity with the axis of the shaft, but the upper conical fit, 64 and 72, could be omitted by changing the mean angularity of the bearing surfaces and the surfaces of conical fit with respect to the axis of the shaft so that the apex of the cone of the mean normals to the surfaces of conical fit would approximately coincide with the center of curvature of the bearing surfaces.

In general, if the center of curvature of the spherical bearing surfaces is disposed at that point in the axis of the shaft where said axis is intersected by the normals to the surface of fit between the thrust block and the runner, or more generally between the rotary thrust element and the shaft, the lower or inner end of the runner can move a small amount with reference to the shaft without developing looseness or eccentric action and therefore without departing from the advantages to be gained by the use of a spherical bearing. This is illustrated somewhat diagrammatically by the construction of Fig. 8 wherein the rotary thrust element 80, here shown in one piece, is provided with a convex spherical bearing surface 81 and a cylindrical surface of fit 82 with the shaft 83, the center of curvature 84 of said spherical bearing surface being disposed in the axis of the shaft at the point of intersection therewith by the mean normals to the cylindrical surface of fit 82. With such a construction, the fit between the runner and the shaft should be a pressed fit of sufficient magnitude so that the expansion of the runner, under the heat of friction, will not cause the cylindrical surfaces 82 to separate. As shown, a nut 85 is threaded onto the shaft, or a separate thrust block of any suitable construction could be applied to the shaft above and drivingly connected with the element 80, for transmitting the thrust load from the shaft to the bearing surfaces. Amplifications of this principle are illustrated in the embodiments of Figs. 9 and 10 next to be described.

In the embodiment of Fig. 9, the rotary thrust element is made in one piece, designated 90, and retained on the shaft against a shoulder 91 by a nut 92. Said rotary thrust element 90 has a convex spherical bearing surface 93 which cooperates with a stationary bearing member 94 of any suitable construction and supported in any suitable way. In this embodiment the shoulder 91 is located approximately in the right angular plane which intersects the axis of the shaft at the center of curvature of the bearing surfaces. The fit between the rotary thrust element 90 and the shaft is a pressed fit of sufficient magnitude to leave a residual pressure between the cylindrical surfaces when the thrust element has been heated to its normal temperature, so that said element always remains concentric with the shaft. The neck of the shaft provided by the reduction in diameter at the shoulder possesses some flexibility and some relative movement may exist between the bearing surfaces in accordance with the characteristics of a spherical bearing.

In the embodiment of Fig. 10, the shaft 96 is provided with a somewhat broader shoulder 97 than shown in the embodiment of Fig. 9, and enables the use of an adjusting ring 98 between the shoulder 97 and the rotary thrust element 99. Said rotary thrust element 99 is provided with a convex spherical bearing surface 100 that cooperates with a correspondingly shaped stationary bearing member 101 of any suitable construction and supported in any suitable way. By interposing rings 98 of different thicknesses the bearing can be suitably adjusted. The rotary thrust element 99 is drivingly connected with the shaft by a nut 102, and a pressed fit with the shaft at both sides of the shoulder 97. In order to avoid the weakening of the shaft neck when a key or keys 103 are employed between the shaft and the rotary thrust element, the keyways are placed in the heavier portion of the shaft as shown, and two diametrically opposite keys are preferably employed in order that the stresses in the shaft just below the collar may be equalized. In this embodiment the center of curvature of the bearing surfaces is disposed in the axis of the shaft adjacent where the latter is intersected by the plane of mean normals to the lower cylindrical surfaces of fit, or approximately at the location of the keys. Therefore, the rotary thrust element is secured to the shaft in a manner that will maintain concentricity after said element has become heated in operation and also the characteristic advantages of a spherical bearing are secured.

In the last three embodiments the radial component of the thrust pressure at the bearing surfaces tends to press the rotary thrust element toward the shaft and resist the tendency of said element to separate from the shaft under the expansion due to the rise of temperature in said element. By making the fit of said element to said shaft such that there is a residual pressure of fit between said thrust element and shaft when the parts have become heated, concentricity of the parts is maintained at or adjacent the center of curvature of the bearing surfaces. Thus the proper location of the center of curvature of the bearing surfaces with respect to the point of intersection with the axis of the shaft of the mean normals to the surface of fit provided on the rotary thrust element permits some relative movement at the bearing surfaces without loss of the charateristic advantages of a spherical bearing.

In Fig. 11 some of the features of the present invention are embodied in a bearing wherein the spherical bearing surface of the rotary thrust element is concave. In this embodiment the shaft 110 is provided with an integral thrust block 111 so that the radially outward components of the bearing reaction and the expansive forces due to the heat of friction cannot separate the block from the shaft. Mounted on the thrust block 111 is a runner 112, which may be split with the sections thereof suitably secured together as heretofore described, provided with a concave spherical bearing surface 113 which cooperates with a stationary bearing member 114 having a convex bearing surface and which may be of any suitable construction and mounted in any suitable way. Thrust block 111 is provided with an axially extending cylindrical flange 115 provided with inner and outer turned cylindrical surfaces 116 and 117. The runner 112 is provided with an annular recess 118, having inner and outer turned cylindrical surfaces for cooperation with said surfaces 116 and 117. When the runner is relatively thin the thrust block should be large in a radial direction with respect to the radial width of the runner, approximating the radial width of the latter, so as to provide a large area of engagement between the runner and the block. Where the runner is relatively thick, the flange may be made radially narrow, in which event the thrust block may terminate at the outer surface of said flange as shown. If the thrust load is applied to the top of the runner by engagement of the thrust block therewith radially inside and outside of the flange 115, the inner surface 119 of said flange 115 preferably does not contact the bottom of the recess 118 in order to avoid the necessity for very accurate machining, although contact of the flange 115 with the bottom of the recess 118 as well as contact between the surfaces of the thrust block and runner inside and outside of said flange is not prohibited if the workmanship is sufficiently accurate.

This construction provides two close cylindrical fits at the surfaces 116 and 117. The outer cylindrical fit operates to maintain the desired concentricity between the thrust block and the runner when they are cool, and the inner cylindrical fit operates to maintain such concentricity when the parts become warm. As the runner heats up, it expands more than the thrust block and the fit passes from the outer cylindrical surface 117 to the inner cylindrical surface 116, but the only lack of concentricity that can arise is equal to one-half the clearances provided, and if these clearances are maintained properly low the maximum eccentricity that can arise is on the order of .001", which is negligible. This construction facilitates the use of a split runner, because the runner can be made relatively thin and at the same time several bolts can be used at each joint and these bolts disposed closely to the bearing surfaces, thereby enabling the use of a thinner runner than can ordinarily be used where the bearing surface thereof is concave.

It will therefore be perceived that by the present invention a spherical thrust bearing has been provided which facilitates the use of split runners and split thrust blocks, or both, and whereby the bearing surface of the runner can be made convex as well as concave, and whereby provision is made to assure that the parts will be retained in their desired concentricity notwithstanding the expansion due to the heat of friction or the radial component of the thrust load. The present invention also possesses numerous other advantages that will be apparent to those skilled in the art, including simplicity of construction, facility of adjustment, etc.

While some of the embodiments of the present invention have been disclosed with particular reference to the use of a split thrust block or split runner, or both, and the present invention facilitates the use of such, it is to be expressly understood that it is within the purview of this invention to use one piece runners or thrust blocks or both, if preferred. While the present invention enables the thrust block to be made separately from the shaft, it is also within the purview of this invention to employ a thrust block which is integral with the shaft.

While the illustrated embodiments of the invention have been described with considerable particularity, it is to be expressly understood that the invention is not restricted thereto, as it is capable of receiving a variety of mechanical expressions, some of which will now readily suggest themselves to those skilled in the art, while changes may be made in the details of construction, arrangement and proportion of parts, and certain features used without other features, without departing from the invention. Moreover, features illustrated only in conjunction with one embodiment may be used in other embodiments, and various combinations can be made of the several features illustrated and described, within the present invention. Reference is therefore to be had to the claims hereto appended for a definition of the limits of said invention.

What is claimed is:—

1. In a thrust bearing, in combination with a shaft, a separate thrust block attached thereto, a runner carried by said thrust block, said thrust block and runner having conical surfaces of engagement, and a stationary bearing member cooperating with said runner, said runner having a convex bearing surface and said stationary bearing member having a mating concave bearing surface.

2. In a thrust bearing, in combination with a shaft, a separate thrust block attached thereto, a runner carried by said thrust block, said thrust block and runner having mating conical and cylindrical surfaces of engagement and said runner having a convex bearing surface, and a stationary bearing member having a concave bearing surface cooperating with the bearing surface of said runner.

3. In a thrust bearing, in combination with a shaft, a separate thrust block attached thereto and having a convex conical surface, a runner carried by said thrust block and having a concave conical surface cooperating with said first-named conical surface, said runner being provided with a convex bearing surface, and a stationary bearing member having a concave bearing surface cooperating with said runner.

4. In a thrust bearing, in combination with a shaft, a split thrust collar carried by said shaft, said thrust collar having a convex conical surface, a runner carried by said thrust collar and having a concave conical surface cooperating with the conical surface on said thrust collar, said runner having a convex bearing surface, and a stationary bearing member having a concave bearing surface cooperating with said runner.

5. In a thrust bearing, in combination with a shaft, a thrust block carried thereby and having a convex conical surface, a split runner carried by said thrust block and having a concave conical surface cooperating with said first-named conical surface, said runner also having a convex spherical bearing surface, and a stationary bearing member having a concave spherical bearing surface cooperating with said runner.

6. In a thrust bearing, in combination with a shaft, a separate thrust block adjustably attached thereto, a runner carried by said thrust block and provided with a convex bearing surface, and a stationary bearing member having a concave bearing surface cooperating with said runner.

7. In a thrust bearing, in combination with a shaft, a split thrust block carried thereby, a runner carried by said thrust block and provided with a convex bearing surface, and a stationary bearing member having a concave bearing surface cooperating with said runner.

8. In a thrust bearing, in combination with a shaft, a thrust block carried thereby, a split runner carried by said thrust block and provided with a convex bearing surface, and a stationary bearing member having a concave bearing surface cooperating with said runner.

9. In a thrust bearing, in combination with a shaft, a thrust block thereon, a split runner carried by said thrust block, said thrust block and runner having cooperating surfaces to maintain said parts concentric when the bearing is in operation, and a stationary bearing member cooperating with said runner, said runner and stationary bearing members having spherical bearing surfaces.

10. In a thrust bearing, in combination with a shaft, a thrust block thereon, a runner carried by said thrust block, said runner and thrust block having cooperating surfaces to maintain said parts concentric when the bearing is in operation and said runner having a convex bearing surface, and a stationary bearing member having a concave bearing member cooperating with said runner.

11. In a thrust bearing, in combination with a shaft, a rotary thrust element carried thereby and having a convex bearing surface, and a stationary bearing member having a mating concave bearing surface, said rotary thrust element being split and pressed toward the shaft by the radial component of the thrust pressure at said bearing surfaces.

12. In a thrust bearing, in combination with a shaft, a thrust block carried thereby and having a convex conical surface, a runner carried by said thrust block and having a concave conical surface cooperating with said first-named conical surface and a convex bearing surface, and a stationary bearing member having a concave bearing surface cooperating with said runner, the center of curvature of said bearing surfaces being disposed approximately at the apex of the cone of mean normals to said first-named conical surface.

13. In a thrust bearing, in combination with a shaft, a thrust collar carried thereby and provided with a plurality of conical surfaces, a runner carried by said thrust collar and having a corresponding plurality of conical surfaces mating with said first-named conical surfaces, and a stationary bearing member cooperating with said runner, said stationary bearing member and runner having spherical bearing surfaces.

14. In a thrust bearing, in combination with a shaft, a thrust block carried thereby and provided with a plurality of conical surfaces of different angularity, a runner carried by said thrust block and having a corresponding number of conical surfaces of like angularity cooperating with said first-named conical surfaces, and a stationary bearing member cooperating with said runner, said runner and stationary bearing member having spherical bearing surfaces.

15. In a thrust bearing, in combination with a shaft, a thrust block carried thereby and having a plurality of convex conical surfaces, a runner carried by said thrust block and having a corresponding number of like concave conical surfaces cooperating with said first-named conical surfaces, and a stationary bearing member cooperating with said runner, said runner and stationary bearing member having spherical bearing surfaces.

16. In a thrust bearing, in combination with a shaft, a thrust block carried thereby and having a plurality of convex conical surfaces of different angularity, a runner carried by said thrust block and having a corresponding number of concave conical surfaces of like angularity, and a stationary bearing member cooperating with said runner, said runner and stationary bearing member having spherical bearing surfaces.

17. In a thrust bearing, in combination with a shaft, a thrust collar carried thereby and having a plurality of conical surfaces, a runner carried by said thrust block and having a corresponding number of conical surfaces cooperating with said first-named conical surfaces, and a stationary bearing member cooperating with said runner, said runner and stationary bearing member having spherical bearing surfaces and the center of curvature of said bearing surfaces substantially coinciding with the apex of the cone of mean normals to one of said sets of conical surfaces.

18. In a thrust bearing, in combination with a shaft, a split elastic thrust block carried thereby provided with conical surfaces, a runner carried by said thrust block and having mating conical surfaces cooperating therewith, and a stationary bearing member cooperating with said runner, said runner and stationary bearing member having spherical bearing surfaces.

19. In a thrust bearing, in combination with a shaft, a rotary thrust element carried thereby and having a surface of fit for cooperation with a corresponding surface associated with said element, said rotary thrust element having a convex spherical bearing surface, and a stationary thrust member having a concave spherical bearing surface cooperating with said runner, the center of curvature of said bearing surfaces substantially coinciding with the point of intersection with the axis of the shaft of the mean normals to said surface of fit.

20. In a thrust bearing, in combination with a shaft, a rotary thrust element carried thereby and having a conical surface of fit for cooperation with a corresponding surface also associated with said element, said rotary thrust element having a convex spherical bearing surface, and a stationary bearing member cooperating with said runner and having a concave spherical bearing surface cooperating with said runner, the center of curvature of said bearing surfaces substantially coinciding with the point on the axis of the shaft which is intersected by the mean normals to said conical surface of fit.

21. In a thrust bearing, in combination with a shaft, a rotary thrust element carried thereby, a spacing ring interposed between the rotary thrust element and shaft for adjusting the location of the bearing surfaces, said rotary thrust element having a convex spherical bearing surface and a surface of fit for cooperation with a corresponding surface also associated with said element to maintain said element concentric with the shaft, and a stationary bearing member having a concave spherical surface cooperating with said element, the center of curvature of said bearing surfaces substantially coinciding with the point on the axis of said shaft intersected by the mean normals of said surface of fit.

22. In a thrust bearing, in combination with a shaft, a rotary thrust element carried thereby, means for securing said thrust element on said shaft under an initial pressure, said rotary thrust element having a convex spherical bearing surface, and a stationary bearing member having a concave spherical bearing surface cooperating with said element.

23. In a thrust bearing, in combination with a shaft, a rotary thrust element carried thereby, means for securing said rotary thrust element on said shaft, a spacing ring for adjusting the location of the bearing surfaces, and a stationary bearing element cooperating with said rotary thrust element, said rotary thrust element having a convex spherical bearing surface and said stationary bearing element having a concave spherical bearing surface.

24. In a thrust bearing, in combination with a shaft, a split rotary thrust element carried thereby, means for securing said rotary thrust element thereon, said rotary thrust element having a convex spherical bearing surface, and a stationary bearing member having a concave spherical bearing surface cooperating with said rotary thrust element and pressing the parts thereof toward said shaft.

25. In a thrust bearing, in combination with a shaft, a split rotary thrust element carried thereby, means for securing said rotary thrust element thereon, said rotary thrust element having a convex bearing surface, a stationary bearing member having a concave bearing surface cooperating with said rotary thrust element, and means between the rotary thrust element and the shaft for adjusting the location of said bearing surfaces.

26. In a thrust bearing, in combination with a shaft provided with a shoulder, a rotary thrust element secured to said shoulder by a pressed fit, said rotary thrust element having a convex bearing surface, and a stationary bearing member having a concave bearing surface cooperating with said rotary thrust element.

27. In a thrust bearing, in combination with a shaft provided with a shoulder, a rotary thrust element secured to said shoulder by a pressed fit, said rotary thrust element having a convex spherical bearing surface, and a stationary bearing member having a concave spherical bearing surface cooperating with said rotary thrust element, the center of curvature of said bearing surfaces approximately coinciding with the point of intersection of the plane of said shoulder with the axis of said shaft.

28. In a thrust bearing, in combination with a shaft provided with a shoulder, a rotary thrust element secured to said shoulder by a pressed fit, said rotary thrust element having a convex spherical bearing surface, and a stationary bearing member having a concave spherical bearing surface cooperating with said rotary thrust element, the center of curvature of said bearing surfaces approximately coinciding with the point on the axis of said shaft which is intersected by the mean normals to the surface of pressed fit.

29. In a thrust bearing, in combination with a shaft, a rotary thrust element carried thereon and having a cylindrical surface of fit therewith, said rotary thrust element having a convex spherical bearing surface, and a stationary bearing member having a concave spherical bearing surface cooperating with said first-named bearing surface, the center of curvature of said spherical bearing surfaces substantially coinciding with the point in the axis of said shaft which is intersected by the plane of mean normals to said surface of fit.

30. In a thrust bearing, in combination with a shaft a rotary thrust element carried thereby and having inner and outer cylindrical surfaces of fit, said rotary thrust element having cylindrical surfaces mating with said surfaces of fit and a spherical bearing surface, and a stationary bearing member having a spherical bearing surface cooperating with said first-named bearing surface.

31. In a thrust bearing, in combination with a shaft, a rotary thrust element carried thereby and having cooperating surfaces of fit whereby said parts are maintained concentric when the bearing has become heated during operation, said rotary thrust element having a convex spherical bearing surface, and a stationary bearing member having a concave spherical bearing surface cooperating with said first-named bearing surface.

32. In a thrust bearing, in combination with a shaft, a split rotary thrust element carried thereby and having cooperating surfaces of fit whereby said shaft and rotary thrust element are maintained concentric when the parts become heated during operation, said rotary thrust element having a spherical bearing surface, and a stationary bearing member having a spherical bearing surface cooperating with said first-named spherical bearing surface.

33. In a thrust bearing, in combination with a shaft, a rotary thrust element carried thereby and having cooperating surfaces of fit whereby said parts are maintained concentric when the bearing has become heated during operation, said rotary thrust element having a convex spherical bearing surface, and a stationary bearing member having a concave spherical bearing surface cooperating with said first-named bearing surface, the center of curvature of said spherical bearing surfaces substantially coinciding with the point in the axis of the shaft which is intersected by the normals to said surface of fit.

34. In a thrust bearing, in combination with a shaft, a rotary thrust element carried thereby and having a pressed fit therewith such that when the parts become heated during operation said shaft and element do not move out of concentricity, said rotary thrust element having a spherical bearing surface, and a stationary bearing member having a spherical bearing surface cooperating with said first-named spherical bearing surface.

35. In a thrust bearing, in combination with a shaft, a split rotary thrust element secured to said shaft and provided with a convex spherical bearing surface, and a stationary bearing member having a concave spherical bearing surface cooperating with said first-named spherical bearing surface.

36. In a thrust bearing, in combination with a shaft, a separate thrust block secured to said shaft and carrying a split runner provided with a convex spherical bearing surface, and a stationary bearing member having a concave spherical bearing surface cooperating with said first-named spherical bearing surface.

37. In a thrust bearing, in combination with a shaft, a split thrust block secured thereto and carrying a runner provided with a convex spherical bearing surface, and a stationary bearing member having a concave spherical bearing surface cooperating with said first-named spherical bearing surface.

38. In a thrust bearing, in combination with a shaft, a thrust block secured thereon and carrying a runner provided with a spherical bearing surface, said thrust block and runner having conical surfaces of fit to maintain said parts concentric when the parts have become heated during operation, and a stationary bearing member having a spherical bearing surface cooperating with said first-named spherical surface.

39. In a thrust bearing, in combination with a shaft, a thrust block secured thereon and carrying a runner provided with a spherical bearing surface, said thrust block and runner having a plurality of surfaces of fit therebetween to maintain said parts concentric when they become heated during operation, and a stationary bearing member having a spherical bearing surface cooperating with said first-named bearing surface.

40. In a thrust bearing, in combination with a shaft, a thrust block secured thereon and carrying a runner provided with a convex spherical bearing surface, said thrust block and runner having conical and cylindrical surfaces of fit therebetween, and a stationary bearing member having a concave spherical bearing surface cooperating with said first-named spherical bearing surface.

41. In a thrust bearing, in combination with a shaft, a thrust block secured thereon and carrying a runner provided with a convex bearing surface, said thrust collar and runner having a plurality of conical surfaces of fit therebetween, and a stationary bearing member having a concave bearing surface cooperating with said first-named bearing surface.

42. In a thrust bearing, in combination with a shaft, a thrust block thereon and carrying a runner provided with spherical bearing surfaces, a plurality of cylindrical surfaces of fit between said block and runner, and a stationary bearing member having a spherical bearing surface cooperating with said first-named bearing surface.

43. In a thrust bearing, in combination with a shaft, a rotary thrust element carried thereby, means for securing said thrust element on said shaft under an initial pressure, said rotary thrust element having a convex spherical bearing surface, and a stationary bearing member having a concave spherical bearing surface cooperating therewith, the center of curvature of said spherical bearing surfaces being located on the axis of said shaft where said thrust element is secured thereto under pressure.

44. In a thrust bearing, in combination with a shaft, a rotary thrust element carried thereby and having a convex spherical bearing surface the center of curvature of which is in the axis of the shaft, and a stationary bearing member cooperating with said rotary thrust element, said rotary thrust element having cooperating surfaces of fit the normal bisectors of which intersect the axis of said shaft at approximately said center of curvature.

45. In a thrust bearing, in combination with a shaft, a thrust block secured thereon, a runner carried by said thrust block and provided with a convex spherical bearing surface the center of curvature of which is located in the axis of said shaft, and a stationary bearing member cooperating with said runner, said thrust block and runner having surfaces of fit the normal bisectors of which intersect the axis of the shaft at approximately said center of curvature.

46. In a thrust bearing, in combination with a shaft, a thrust block carried thereby, a runner carried by said thrust block and having a convex bearing surface, and a stationary bearing member having a concave bearing surface cooperating with said runner, said rotary thrust block being split and pressed toward the shaft by the radial component of the thrust pressure at said bearing surfaces.

47. In a thrust bearing, in combination with a shaft, a thrust block carried thereby, a runner carried by said thrust block and having a convex bearing surface, and a stationary bearing member having a concave bearing surface cooperating with said runner, said rotary thrust block being split and pressed toward the shaft by the radial component of the thrust pressure at said bearing surface and said thrust block and runner having surfaces of fit which maintain said parts concentric during the operation of the bearing.

48. In a thrust bearing, in combination with a shaft, a thrust block carried thereby, a runner carried by said thrust block and having a convex bearing surface, and a stationary bearing member having a concave bearing surface cooperating with said runner, said rotary thrust block being split and pressed toward the shaft by the radial component of the thrust pressure at said bearing surfaces and said thrust block and runner having conical surfaces of fit to maintain said runner concentric with said thrust block when the bearing is in operation.

49. In a thrust bearing, in combination with a shaft, a thrust block thereon, a split runner carried by said thrust block and having a convex bearing surface, and a stationary bearing member having a concave bearing surface cooperating with said runner and pressing the parts thereof toward said shaft.

50. In a thrust bearing, in combination with a shaft, a thrust block thereon, a split runner carried by said thrust block and having a convex bearing surface, and a stationary bearing member having a concave bearing surface cooperating with said runner and pressing the parts thereof toward said shaft, said runner and thrust block having cooperating surfaces to maintain said runner concentric with said thrust block when said bearing is in operation.

51. In a thrust bearing, in combination with a shaft, a thrust block thereon, a split runner carried by said thrust block and having a convex bearing surface, and a stationary bearing member having a concave bearing surface cooperating with said runner and pressing the parts thereof toward said shaft, said runner and thrust block having cooperating conical surfaces to maintain said runner concentric with said thrust block when said bearing is in operation.

In testimony whereof I have signed this specification.

ALBERT KINGSBURY.